United States Patent [19]
Kakihara

[11] Patent Number: 6,163,846
[45] Date of Patent: Dec. 19, 2000

[54] METHOD AND CIRCUIT FOR BACKING UP MEMORY AND CALENDER

[75] Inventor: Koji Kakihara, Tokyo, Japan

[73] Assignee: NEC Corporation, Tokyo, Japan

[21] Appl. No.: 09/174,540

[22] Filed: Oct. 19, 1998

[30] Foreign Application Priority Data

Oct. 17, 1997 [JP] Japan ................................. 9-285683

[51] Int. Cl.$^7$ ................................. G06F 1/26; G06F 1/28
[52] U.S. Cl. .................... 713/300; 713/310; 713/330; 713/340; 713/100; 702/58; 702/61; 702/63; 705/401; 705/410; 307/66
[58] Field of Search ................................. 713/300–340, 713/100; 307/66; 702/58, 61, 63; 705/410, 401

[56] References Cited

U.S. PATENT DOCUMENTS

| 4,701,858 | 10/1987 | Stokes et al. | 702/58 |
|---|---|---|---|
| 5,293,494 | 3/1994 | Saito et al. | 713/100 |
| 5,596,512 | 1/1997 | Wong et al. | 702/63 |
| 5,790,873 | 8/1998 | Popper et al. | 713/300 |
| 5,946,672 | 8/1999 | Chrosny et al. | 705/410 |

FOREIGN PATENT DOCUMENTS

| 63-58522 | 3/1988 | Japan . |
|---|---|---|
| 3-253927 | 11/1991 | Japan . |
| 4-98473 | 3/1992 | Japan . |
| 5-189095 | 7/1993 | Japan . |
| 5-087623 | 11/1993 | Japan . |

Primary Examiner—Ayaz R. Sheikh
Assistant Examiner—Rupal D. Dharia
Attorney, Agent, or Firm—Foley & Lardner

[57] ABSTRACT

Disclosed is a method far backing up memory and calendar, which has the steps of: providing a back-up power source for the calendar separated from the back-up power source for both the memory and the calendar; and continuing to back up the calendar by the separated back-up power source even after stopping the backing-up of the memory. Also disclosed is a circuit for backing up memory and calendar, which has a first power source circuit to supply back-up current to both the memory and the calendar; and a second power source circuit to supply continuously back-up current to the calendar when the supply of back-up current to the memory stops due to reduction in the capacity of the first power source circuit.

3 Claims, 5 Drawing Sheets

METHOD AND CIRCUIT FOR BACKING UP MEMORY AND CALENDER

FIELD OF THE INVENTION

This invention relates to a method and circuit for backing up memory and calendar that is used to retain stored data in memory and clocking operation of calendar when no current from main power source is supplied due to the exchange or exhaustion etc. in a device with memory and calendar.

BACKGROUND OF THE INVENTION

Conventionally, a portable terminal, such as a portable telephone and a portable information terminal, using a primary cell or secondary cell as a sub-cell to back up memory is commercially available.

This sub-cell is, when a main power source as a driving power source in normal operation is removed to charge or cell-exchange, used 1) to conduct a suspend-resume operation to allow the operation state to return to a state just before turning off the main power source when turning on the main power source next time, 2) to retain information stored in memory, or 3) to retain information stored in memory even after the exhaustion of capacity in the main power source.

Further, in case of a device with built-in calendar, an internal circuit to count the calendar time is backed up by the sub-cell for backing up memory to keep on counting the time even when a normal current is not supplied from the main power source.

Also, as a method for restoring contents of main memory being lost when turning off the main power source, there is a method that necessary information, such as data, application program and system program, e.g., OS, is stored into a file in non-erasable area, then loaded from the file to memory when starting the operation. For example, Japanese patent application laid-open No. 4-098473 (1992) discloses a method of loading from non-volatile memory.

However, even in such a method of loading from non-volatile memory, the information needs to be backed up while being loaded on the memory in order to conduct the suspend-resume operation mentioned above before and after exchanging the main cell. Namely, it also needs a sub-cell as the portable terminal does.

However, there is conventionally a problem that both memory and calendar are lost when the sub-cell is exhausted because one sub-cell is used for backing up both the memory and calendar. Furthermore, after reviving the main power source, through, as to memory, necessary information can be loaded by using, e.g., the method of loading from non-volatile memory when turnings on the power source next time, calendar is necessary to re-input, which takes time.

Also, in case of a device that employs the method of loading from non-volatile memory, as shown in Table 1, there is a problem that a same sub-cell is used to back up memory as to which relatively large back-up current is necessary for, e.g., the suspend-resume operation during the exchange of main cell but the back-up time is allowed to be short, and calendar as to which back-up current is allowed to small but it is desired to retain for a long period.

TABLE 1

| Object | Required Current | Desired Back-up Period | Restoring Method |
| --- | --- | --- | --- |
| memory | large | short time (max. 24 hrs.) | loading from non-volatile memory |
| calendar | small | long time (longer than 5 yrs.) | re-inputting date and time manually |

SUMMARY OF THE INVENTION

Accordingly, it is an object of the invention to provide a method for backing up memory and calendar by which back-up time can be secured taking each object to be backed up into account.

It is a further object of the invention to provide a circuit for backing up memory and calendar by which back-up time can be secured taking each object to be backed up into account.

According to the invention, a method for backing up memory and calendar, where a back-up power source for both a memory and a calendar keeps the memory stored and the calendar clocked when current supply from a main power source of a device with the memory and the calendar stops, comprises the steps of:

providing a back-up power source for the calendar separated from the back-up power source for both the memory and the calendar; and continuing to back up the calendar by the separated back-up power source even after stopping the backing-up of the memory.

According to another aspect of the invention, a circuit for backing up memory and calendar, where a back-up power source for both a memory and a calendar keeps the memory stored and the calendar clocked when current supply from a main power source of a device with the memory and the calendar stops, comprises:

a first power source circuit to supply back-up current to both the memory and the calendar; and a second power source circuit to supply continuously back-up current to the calendar when the supply of back-up current to the memory stops due to reduction in the capacity of the first power source circuit.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
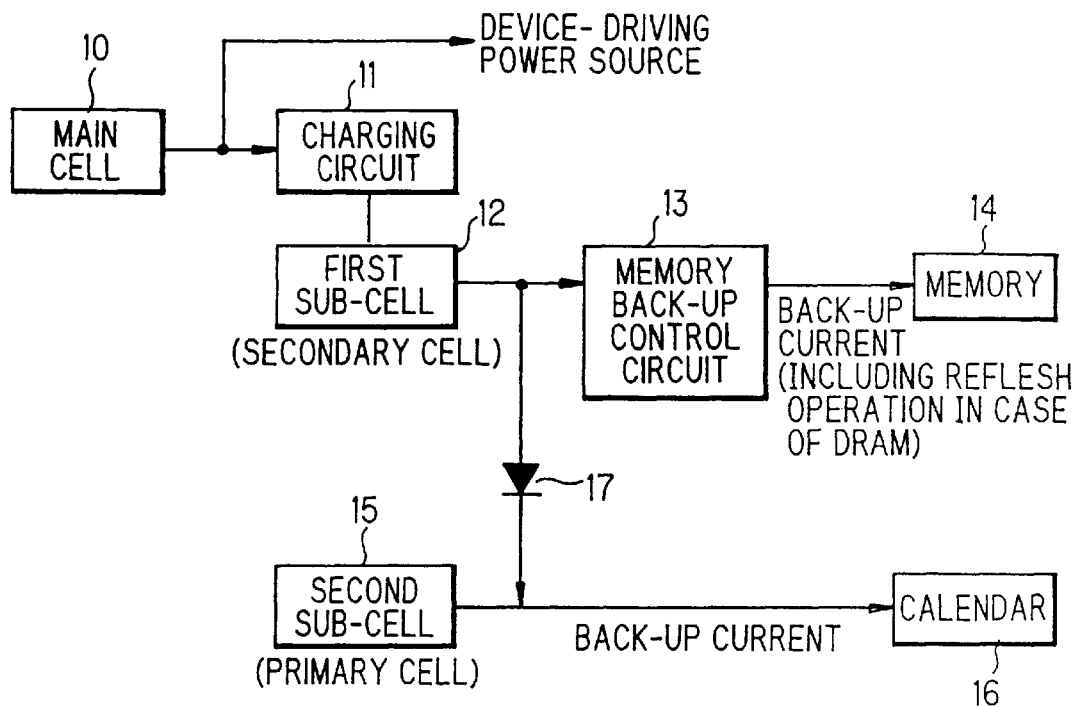
FIG. 1 is a block diagram showing a method and circuit for backing up memory and calendar in a first preferred embodiment according to the invention.
Figure 2:
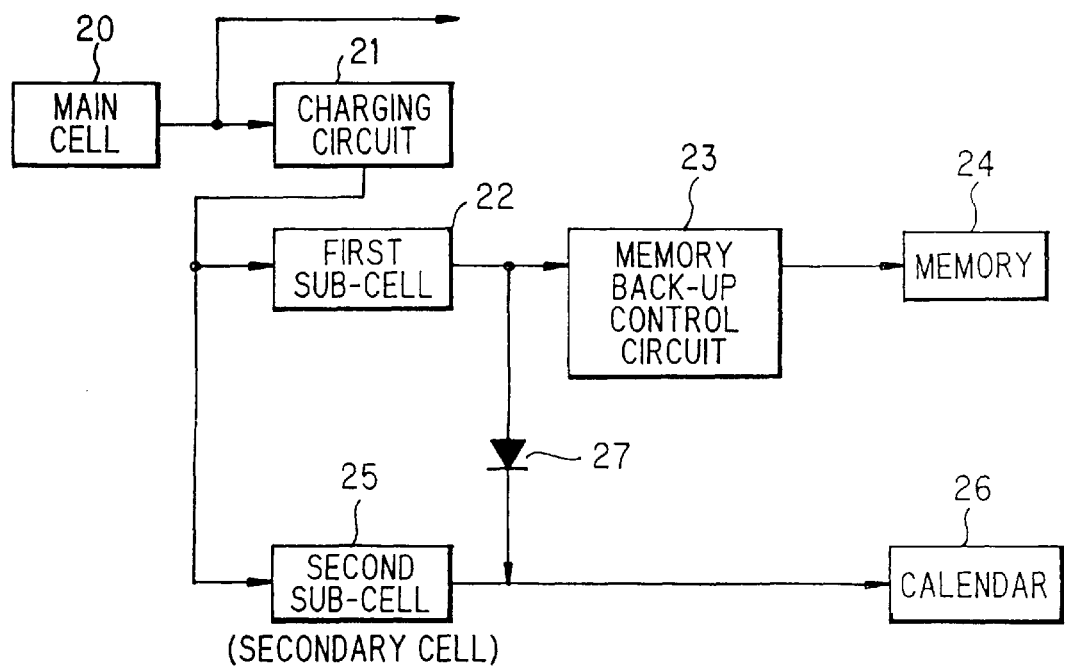
FIG. 2 is a block diagram showing the case that a second sub-cell 15 in the first embodiment is a secondary cell rechargeable.

A method and circuit for backing up memory and calendar in the first preferred embodiment according to the invention will be explained in FIGS. 1 and 2. FIGS. 1 and 2 are block diagrams showing the method and circuit for backing up memory and calendar in the first embodiment, where two sub-cells are employed.

This back-up power source circuit supplies a back-up driving current to a memory 14 and a calendar 16 when a main cell 10 as a device-driving power source is removed. It comprises a first sub-cell 12, which is a secondary cell, for backing up both the memory and the calendar, a charging circuit 11 to charge the first sub-cell 12, a memory back-up control circuit 13 to control back-up current for the memory 14, a second sub-cell 15 used only to back up the calendar 16, and a diode 17 to block current to flow into the memory back-up circuit side from the calendar 16 and the second sub-cell 15.

Next, the operation of this circuit will be explained.

In normal operation, the main cell 10 supplies current through the charging circuit 11 etc. to the memory 14 and the calendar 16, and charges the first sub-cell 12 to its full capacity, B1 by floating. When the main cell 10 is removed, the sub-cell 12 backs up the memory 14 through the back-up memory control circuit 13, and backs up the calendar 16 through the diode 17. The second sub-cell 15 backs up only the calendar 16.

Figure 3:
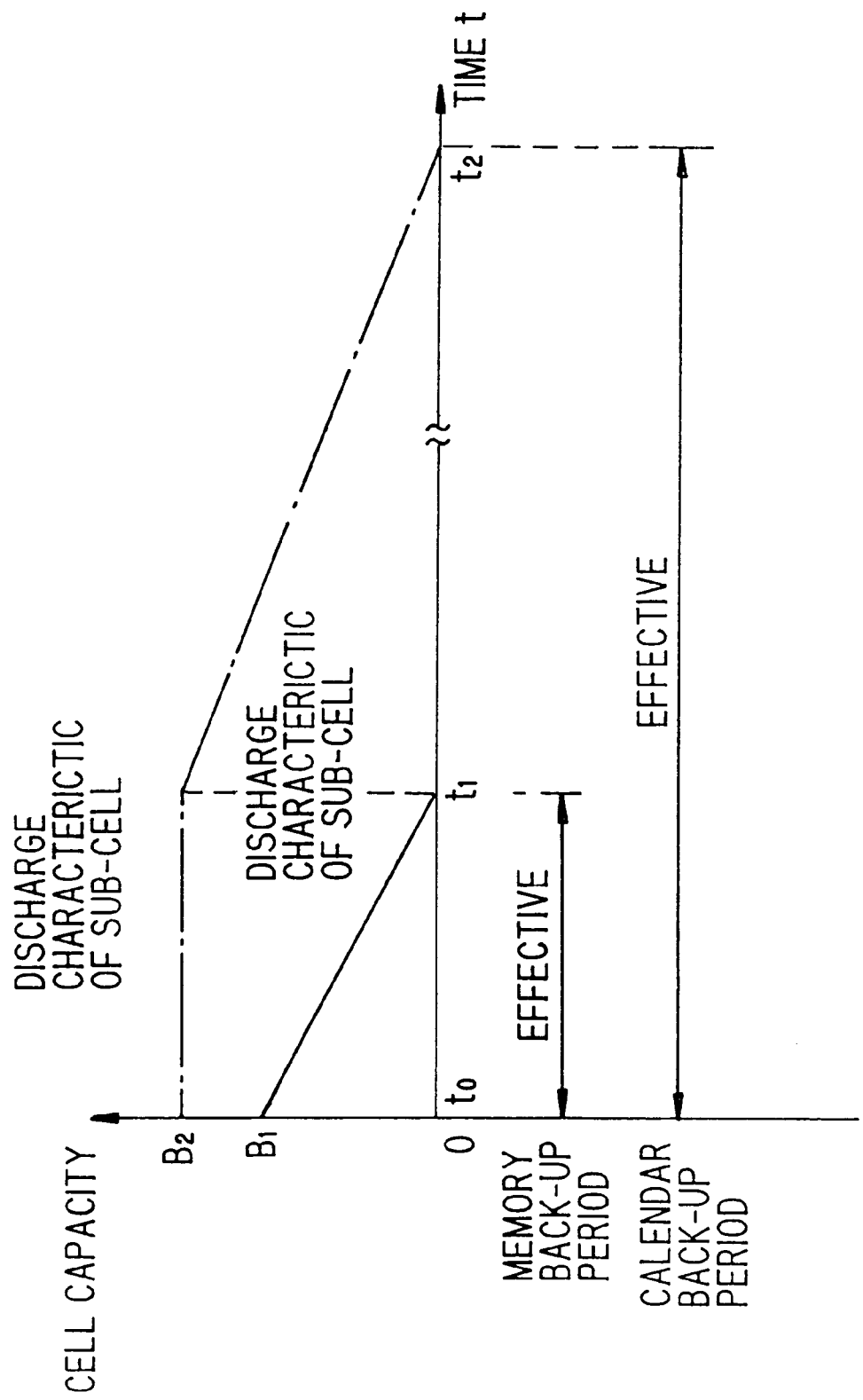
FIG. 3 is a graph showing the discharge characteristics of the first and second sub-cells in the first embodiment.

The discharge characteristics of the sub-cells in back-up operation are shown in FIG. 3. Namely, between initial time t0 and time t1 when the cell capacity of the first sub-cell 12 is exhausted, the first sub-cell 12 backs up the memory 14 and the calendar 16 whereby the cell capacity B1 is consumed, where the capacity of the first sub-cell 12 at time t0 when the main cell 10 is removed is defined as B1 and the cell capacity of the second sub-cell 15 is defined as B2. In this period, both the data of the memory 14 and operation of the calendar 16 can be guaranteed and the cell capacity B2 of the second sub-cell 15 to back up only the calendar 16 is little consumed. Also, when the main cell is revived in this period, the first sub-cell 12 starts to be charged, thereby restoring the cell capacity to B1.

When the cell capacity B1 of the first sub-cell 12 is exhausted at time t1, the backing up of the memory 14 is lost and the contents of the memory becomes unstable thereafter. However, the calendar 16 is backed up by the second sub-cell 15 until time t2 when the cell capacity B2 is exhausted.

Though the second sub-cell 15 in FIG. 1 has been explained supposed as a primary cell, it can be a secondary cell as shown in FIG. 2 and charged, as well as the first sub-cell 12, by a charging circuit 21 during the running of a main cell 20.

In the case that the second sub-cell 15 is a primary cell, the unit cost is inexpensive, but the initial cell capacity B2 of the second sub-cell 15 at time t1 when the first sub-cell 12 is exhausted is, since the second time, gradually reduced when the second sub-cell 15 repeats intermittently the exclusive backing-up of the calendar 16. Thereby, the rest of back-up effective period becomes uncertain. Therefore, there occurs the problem that the second sub-cell 15 is likely to be changed even when the rest of cell capacity is enough.

So, with the second sub-cell 15 as a secondary cell and by charging it by the charging circuit 11 during the running of the device, the cell capacity of the second sub-cell 15 can be always kept at the predetermined value B2 at time t1 to start the exclusive backing-up of the calendar 16 next time, while the cell capacity of the second sub-cell 15 reduces each time the exclusive backing-up of the calendar 16 is repeated several times.

Also, each of the memory and the calendar may be provided with an exclusive back-up power source. In this case, each cell is consumed independently of the other cell and therefore, in the long-term use, the backing-up of the calendar does not always continue when the backing-up of the memory stops. Accordingly, to guarantee the continuous backing-up of the calendar after the backing-up of memory stops, it is necessary to always check the consumption state of both cells and to change it for a new one according to the consumption state.

Next, a method and circuit for backing up memory and calendar, where a memory and a calendar are separately backed up by one sub-cell, in the second preferred embodiment according to the invention will be explained in FIGS. 4 and 5.

Figure 4:
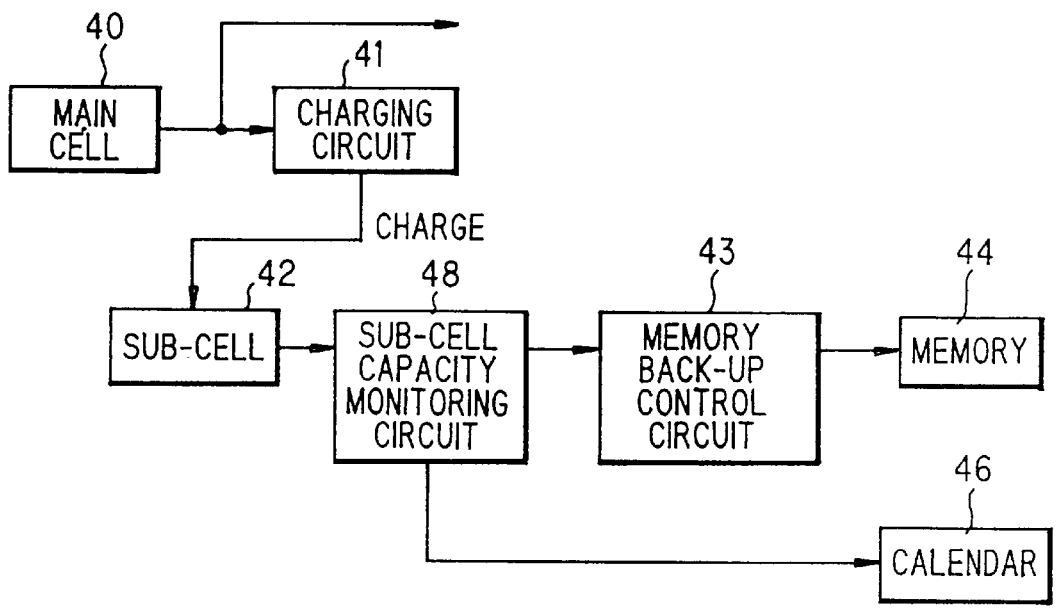
FIG. 4 is a block diagram showing a method and circuit for backing up memory and calendar in a second preferred embodiment according to the invention.
Figure 5:
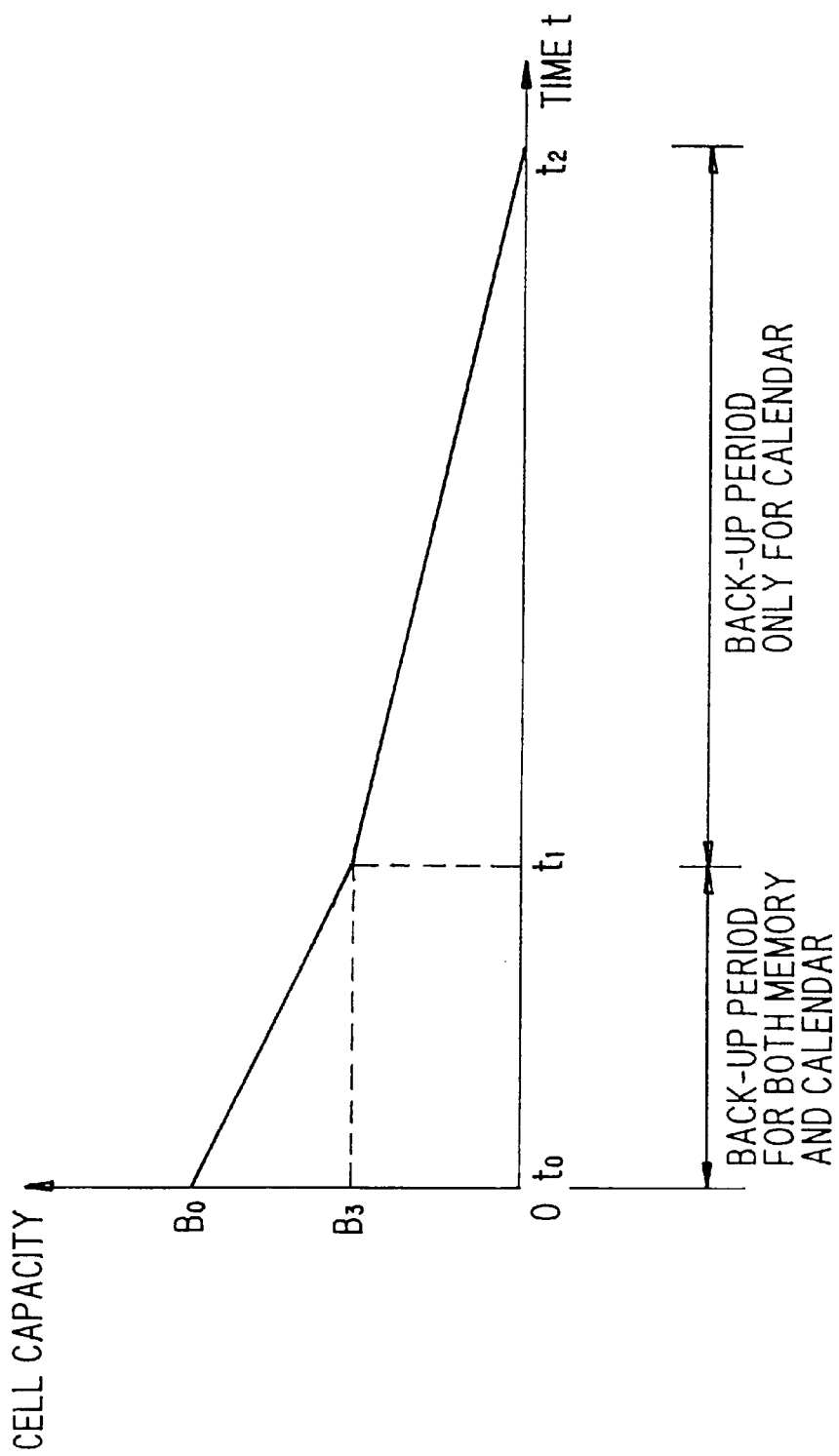
FIG. 5 is a graph showing the discharge characteristic of a sub-cell in the second embodiment.

The back-up power source circuit in this embodiment includes, as shown in FIG. 4, one sub-cell 42 and a sub-cell capacity monitoring circuit 48 that monitors the capacity of the sub-cell 42 and distributes the output of the sub-cell 42 to a calendar 46 and a memory 44 according to the monitoring result.

The sub-cell capacity monitoring circuit 48 monitors the capacity of the sub-cell 42, stops supplying current to the memory back-up circuit 43 when detecting that the initial capacity B0 of the sub-cell 42 reduces to a predetermined value B3, and changes into the exclusive backing-up of the calendar 46. Thereby, as shown in FIG. 5, both the memory and the calendar are backed up until tire t1 when the capacity of the sub-cell 42 reduces from the initial capacity B0 to the predetermined value B3 and the output is changed, and only the calendar is backed up from time t1 of the changing point until time t2 when the capacity of the sub-cell 42 becomes zero.

In the second embodiment, the back-up period of memory is limited within the period when the capacity of the sub-cell 42 changes from B0 to B3. However, in the case that the main power source is often revived before reaching B3, there is an advantage on the mounting that it only has to have one sub-cell. Moreover, after the capacity of the sub-cell 42 reaches B3, the calendar can be backed up longer than that of the conventional device.

Figure 6:
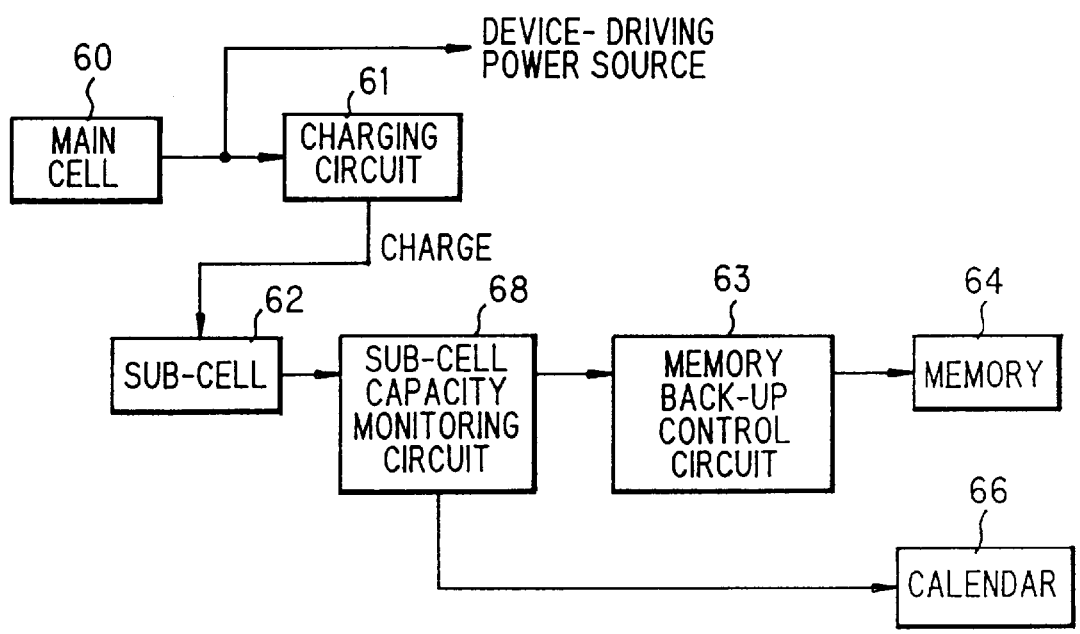
FIG. 6 is a block diagram showing a method and circuit for backing up memory and calendar in a third preferred embodiment according to the invention.

Though, in the above explanations, all the main power sources have been supposed as a portable unit using a cell, the present invention can also be applied to a back-up power-source device of installed type using an alternating-current power source (as shown in FIG. 6).

Advantages of the Invention

As described above, in the present invention, the back-up power source for both and memory and calendar and the other back-up power source only for calendar are provided. Therefore, there is an advantage that the backing-up of calendar can be continued even after the backing-up of memory is stopped.

Also, by providing the first sub-cell for both and memory and calendar and the second sub-cell only for calendar, the maintenance of the sub-cells can be easy to conduct, and an optimum back-up period for each of memory and calendar can be obtained.

Also, at the beginning, one sub-cell is used to back up both memory and calendar while monitoring the capacity of the sub-cell, and, when the rest of capacity becomes less than a predetermined value, current supply to memory is stopped and only the calendar is backed up. Therefore, there is an advantage that one sub-cell only has to be mounted.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A circuit for backing up memory and calendar, where a back-up power source for both a memory and a calendar keeps the memory stored and the calendar clocked when current supply from a main power source of a device with the memory and the calendar stops, comprising:

a first power source circuit to supply back-up current to both the memory and the calendar; and a second power source circuit to supply continuously back-up current to the calendar when the supply of back-up current to the memory stops due to reduction in the capacity of said first power source circuit;

said first power source circuit comprises a single sub-cell to back up both the memory and the calendar, a charging circuit to charge said sub-cell, and a memory back-up control circuit to control the back-up current of the memory; and said second power source circuit comprises a sub-cell capacity monitoring circuit that is inserted between said sub-cell and said memory back-up control circuit, and that stops the current supply to the memory and supplies back-up current only to the calendar when detecting that the rest of capacity of said sub-cell becomes less than a predetermined value.

2. A circuit for backing up memory and calendar, according to claim 1, wherein:

said main power source is a direct-current portable device.

3. A circuit for backing up memory and calendar, according to claim 1, wherein:

said main power source is an alternating-current installed-type device.

* * * * *